United States Patent [19]

Takimoto et al.

[11] Patent Number: 5,052,785
[45] Date of Patent: Oct. 1, 1991

[54] COLOR LIQUID CRYSTAL SHUTTER HAVING MORE GREEN ELECTRODES THAN RED OR BLUE ELECTRODES

[75] Inventors: Masaaki Takimoto; Isamu Hatanaka, both of Tokyo, Japan

[73] Assignee: Fuji Photo Film Co., Ltd., Kanagawa, Japan

[21] Appl. No.: 548,799

[22] Filed: Jul. 6, 1990

[30] Foreign Application Priority Data

Jul. 7, 1989 [JP] Japan .................................. 1-176820

[51] Int. Cl.$^5$ .............................................. G02F 1/13
[52] U.S. Cl. ......................................... 359/54; 359/61; 359/68; 359/87
[58] Field of Search ..................... 350/336, 339 F, 333; 355/32 US, 27 US; 346/157, 701, 702, 703

[56] References Cited

U.S. PATENT DOCUMENTS

| | | | |
|---|---|---|---|
| 4,601,546 | 7/1986 | Ohta | 350/339 F |
| 4,605,972 | 8/1986 | Hatanaka | 350/332 X |
| 4,636,817 | 1/1987 | Masaki | 350/336 X |
| 4,642,619 | 2/1987 | Togashi | 340/784 X |

FOREIGN PATENT DOCUMENTS 60-53925 3/1985 Japan .

Primary Examiner—Stanley D. Miller
Assistant Examiner—Ron Trice
Attorney, Agent, or Firm—Sughrue, Mion, Zinn Macpeak & Seas

[57] ABSTRACT

A color liquid crystal shutter matrix for use in a color image printer for example has a liquid crystal panel including a liquid crystal sealed between transparent substrates. A drive electrode assembly is mounted in the liquid crystal panel and drivable by color image information corresponding to three colors R, G and B. Color filters on the liquid crystal panel is composed of thin films containing dyes or pigments of R, G and B. The drive electrode assembly comprises a plurality of arrays of pixel electrodes, the arrays corresponding to the three colors of R, G and B, respectively. The number of the pixel electrodes corresponding to the color G is greater than the number of the pixel electrodes corresponding to each of the colors R and B.

11 Claims, 9 Drawing Sheets

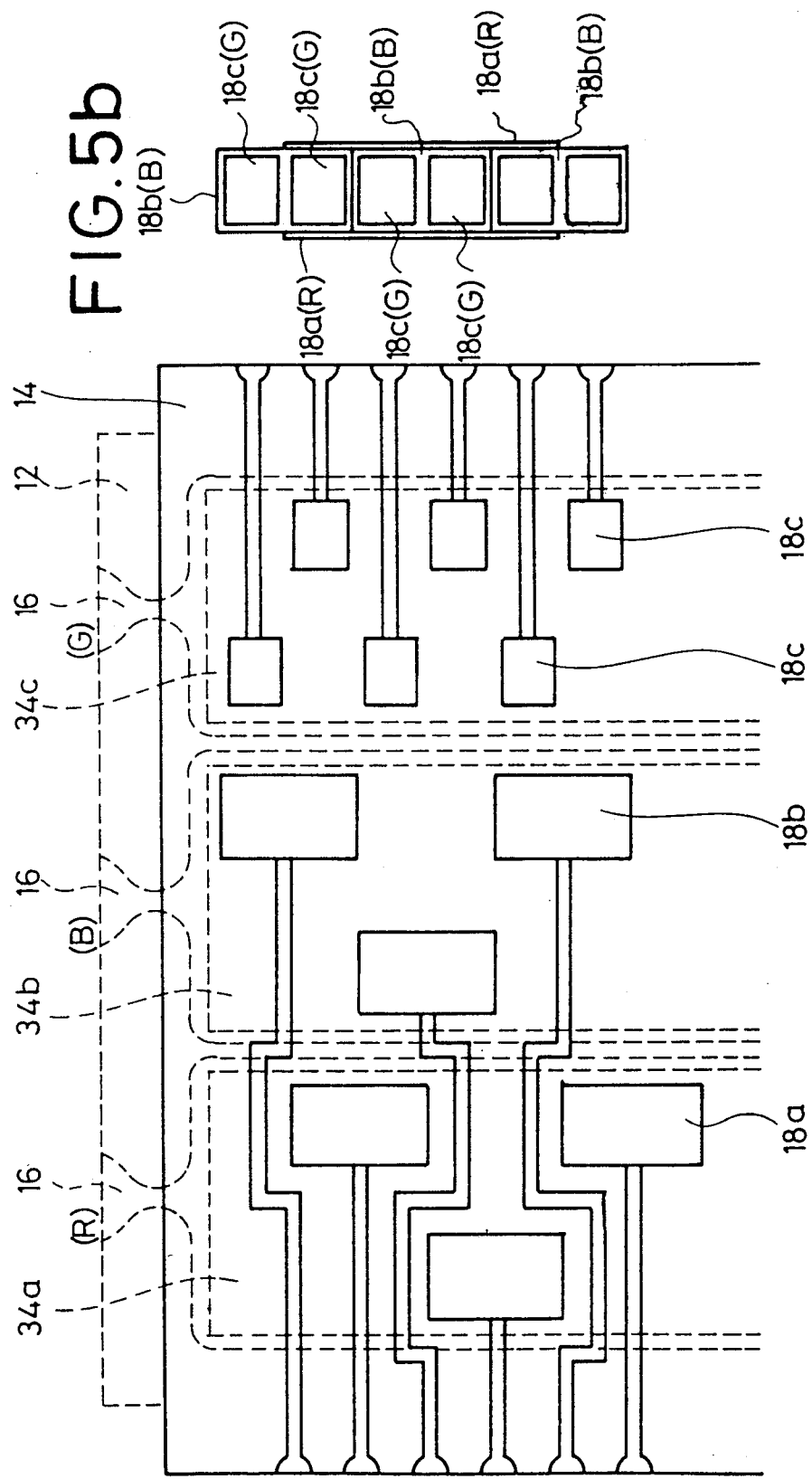

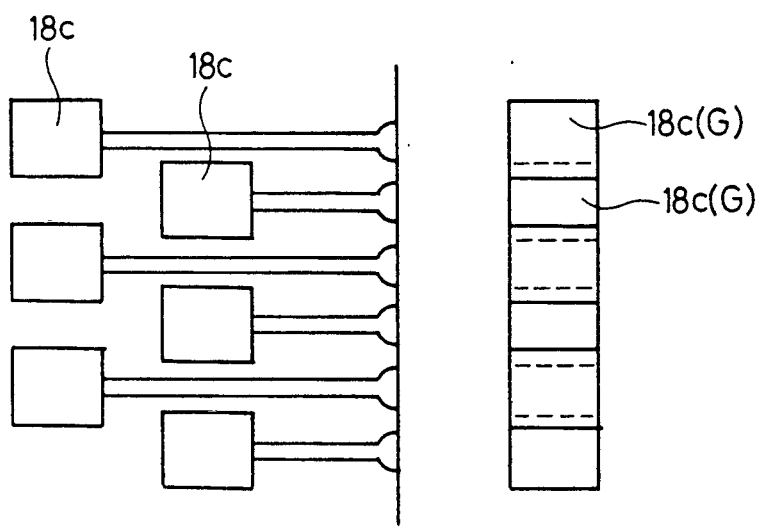

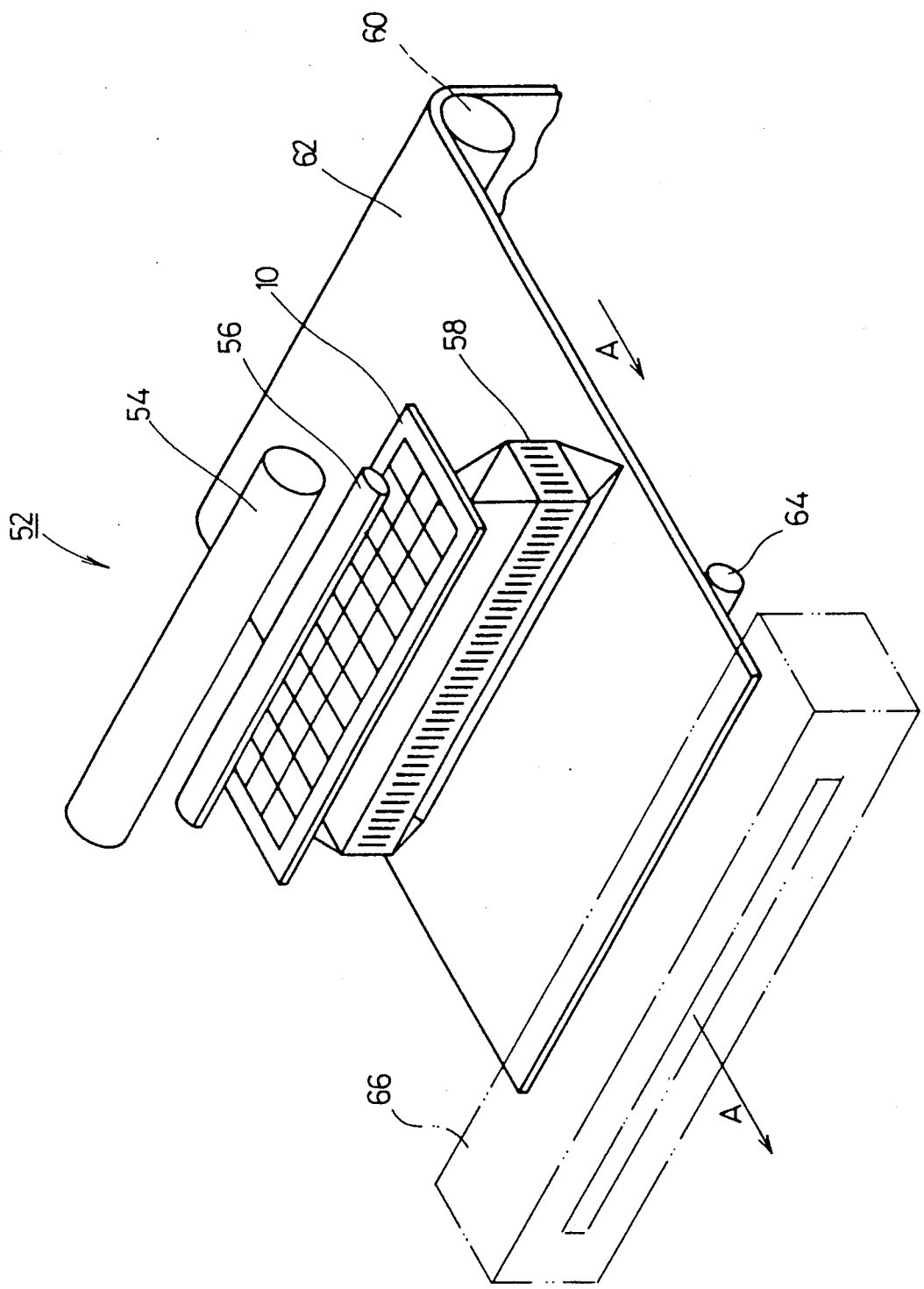

COLOR LIQUID CRYSTAL SHUTTER HAVING MORE GREEN ELECTRODES THAN RED OR BLUE ELECTRODES

BACKGROUND OF THE INVENTION

The present invention relates to a color liquid crystal shutter matrix, and more particularly to a color liquid crystal shutter matrix of the type which comprises a liquid crystal panel with a liquid crystal sealed between transparent substrates, polarizing films mounted on the liquid crystal panel, a drive electrode assembly mounted in the liquid crystal pane and drivable by color image information corresponding to three colors R (red), G (green) and B (blue), and color filters mounted on the liquid crystal panel and composed of thin films containing dyes or pigments of R, G and B.

There have heretofore been known color image printers which read an image carried by a photographic film or an original, process the read image with an image processor comprising a microcomputer, and reproduces the processed image as a visible image.

One such color image printer comprises a three-color rotary color filter and a liquid crystal shutter matrix as disclosed in U.S. Pat. No. 4,605,972. Depending on color image information corresponding to three colors R, G and B, the three-color rotary color filter is rotated and the liquid crystal shutter matrix is energized to print a color image. The color image printer of this type is slow in printing speed.

Another known color image printer comprises a color liquid crystal shutter matrix which includes a drive electrode assembly mounted in a liquid crystal panel and drivable by color image information corresponding to three colors R, G and B and color filters mounted on the liquid crystal panel and composed of thin films containing dyes or pigments of R, G and B.

More specifically, as shown in FIG. 1 of the accompanying drawings, the color filters are composed of thin films 4a, 4b, 4c containing dyes or pigments corresponding to R, G and B, the color filters being mounted on a liquid crystal panel 2. The drive electrode assembly comprises a matrix of pixel electrodes 6a, 6b, 6c corresponding to R, G and B. The pixel electrodes 6a, 6b, 6c are arranged in arrays each including pixel electrodes 6a, 6b, 6c and extending in the direction in which a photosensitive medium is fed, i.e., in the direction indicated by the arrow X, and also in arrays each including pixel electrodes 6a or 6b or 6c and extending in the main scanning direction indicated by the arrow Y. The pixel electrodes 6a, 6b, 6c are selectively driven depending on color image information corresponding to R, G and B to drive the liquid crystal shutter matrix for reproducing a color image.

Psychological and physical researches of human vision indicate that the human eyes are most sensitive to green (G or magenta as a subtractive primary). In the known color printer, the pixel electrodes are identical in size and deal equally with R, G and B. The number per unit area of pixel electrodes for G, to which the human eyes are most sensitive, is the same as the number of pixel electrodes for each of the other colors of R and B. As a result, the image which is visually reproduced is relatively poor in fineness.

SUMMARY OF THE INVENTION

It is a major object of the present invention to provide a color liquid crystal shutter matrix which can adjust the number of pixels, per unit area on a reproduced image, corresponding to the color green (G) to which the human visual system is highly sensitive for fineness perception, with the result that the color liquid crystal shutter matrix can be used in a color image printer to print a highly fine color image at an increased speed.

Another object of the present invention is to provide a color liquid crystal shutter matrix comprising a liquid crystal panel which is composed of a pair of transparent substrates and a liquid crystal sealed therebetween, polarizing films mounted on the the liquid crystal panel, a drive electrode assembly mounted in the liquid crystal panel and drivable by color image information corresponding to three colors R, G and B, and color filters mounted on the liquid crystal panel and composed of thin films containing dyes or pigments of R, G and B, the drive electrode assembly comprising a plurality of arrays of pixel electrodes, the arrays corresponding to the three colors of R, G and B, respectively, the number of the pixel electrodes corresponding to the color G being greater than the number of the pixel electrodes corresponding to each of the colors R and B.

Still another object of the present invention is to provide the color liquid crystal shutter matrix wherein the arrays of pixel electrodes corresponding to the colors R, G and B extend along a direction in which the pixel electrodes are scanned, and the pixel electrodes corresponding to the color G are elongate across the direction.

Yet another object of the present invention is to provide the color liquid crystal shutter matrix wherein the arrays of pixel electrodes corresponding to the colors R, G and B extend along a direction in which the pixel electrodes are scanned, and wherein the pixels reproduced by the pixel electrodes corresponding to the color G overlap the pixels reproduced by the pixel electrodes corresponding to the colors R and B, and the pixels reproduced by the pixel electrodes corresponding to the color R overlap the pixels reproduced by the pixel electrodes corresponding to the color B.

Yet still another object of the present invention is to provide the color liquid crystal shutter matrix wherein the arrays of pixel electrodes corresponding to the colors R, G and B extend along a direction in which the pixel electrodes are scanned, and are connected in common whereby the pixel electrodes corresponding to the colors R, G and B can simultaneously be driven across the direction.

A further object of the present invention is to provide the color liquid crystal shutter matrix wherein the arrays of pixel electrodes corresponding to the colors R, G and B extend along a direction in which the pixel electrodes are scanned, and the pixel electrodes corresponding to the color G are staggered along a direction perpendicular to the direction.

A still further object of the present invention is to provide the color liquid crystal shutter matrix wherein the pixels reproduced by the pixel electrodes corresponding to the color G are overlapped.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2b is a view showing an arrangement of pixels of an image which is reproduced using the color liquid crystal shutter matrix shown in FIG. 2a;

FIG. 3 is an enlarged fragmentary cross-sectional view of the color liquid crystal shutter matrix shown in FIG. 2a;

FIG. 4a is a fragmentary plan view of pixel electrodes of a color liquid crystal shutter matrix according to a second embodiment of the present invention;

FIG. 4b is a view showing an arrangement of pixels of an image which is reproduced using the color liquid crystal shutter matrix shown in FIG. 4a;

FIG. 5a is a fragmentary plan view of pixel electrodes of a color liquid crystal shutter matrix according to a third embodiment of the present invention;

FIG. 5b is a view showing an arrangement of pixels of an image which is reproduced using the color liquid crystal shutter matrix shown in FIG. 5a;

FIGS. 7a, 7b, and 7c are views showing different patterns of pixel electrodes in a longitudinal direction of the color liquid crystal shutter matrix; and FIG. 8 is a schematic perspective view of a color image printer which incorporates a color liquid crystal shutter matrix according to the present invention.

DETAILED DESCRIPTION OF THE PREFERRED EMBODIMENTS

Figure 1:
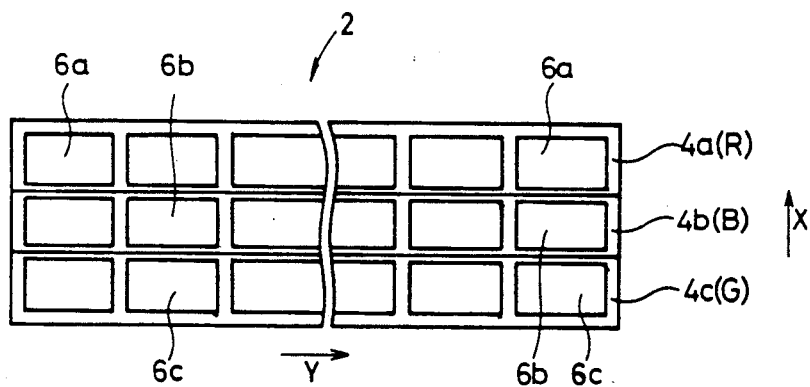
FIG. 1 is a fragmentary plan view of a conventional liquid crystal shutter panel.

Like or corresponding parts are denoted by like or corresponding reference numerals throughout views.

Figure 2B:
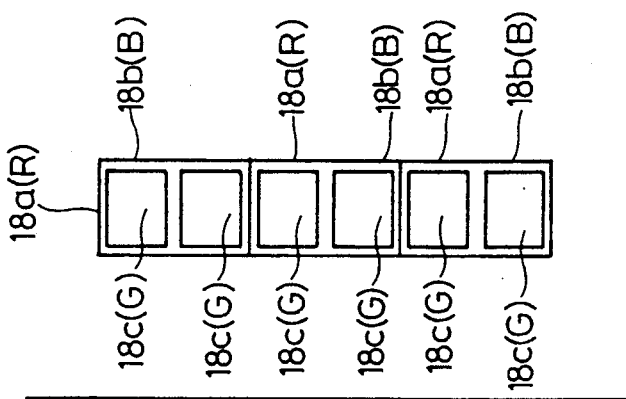
Figure 2A:
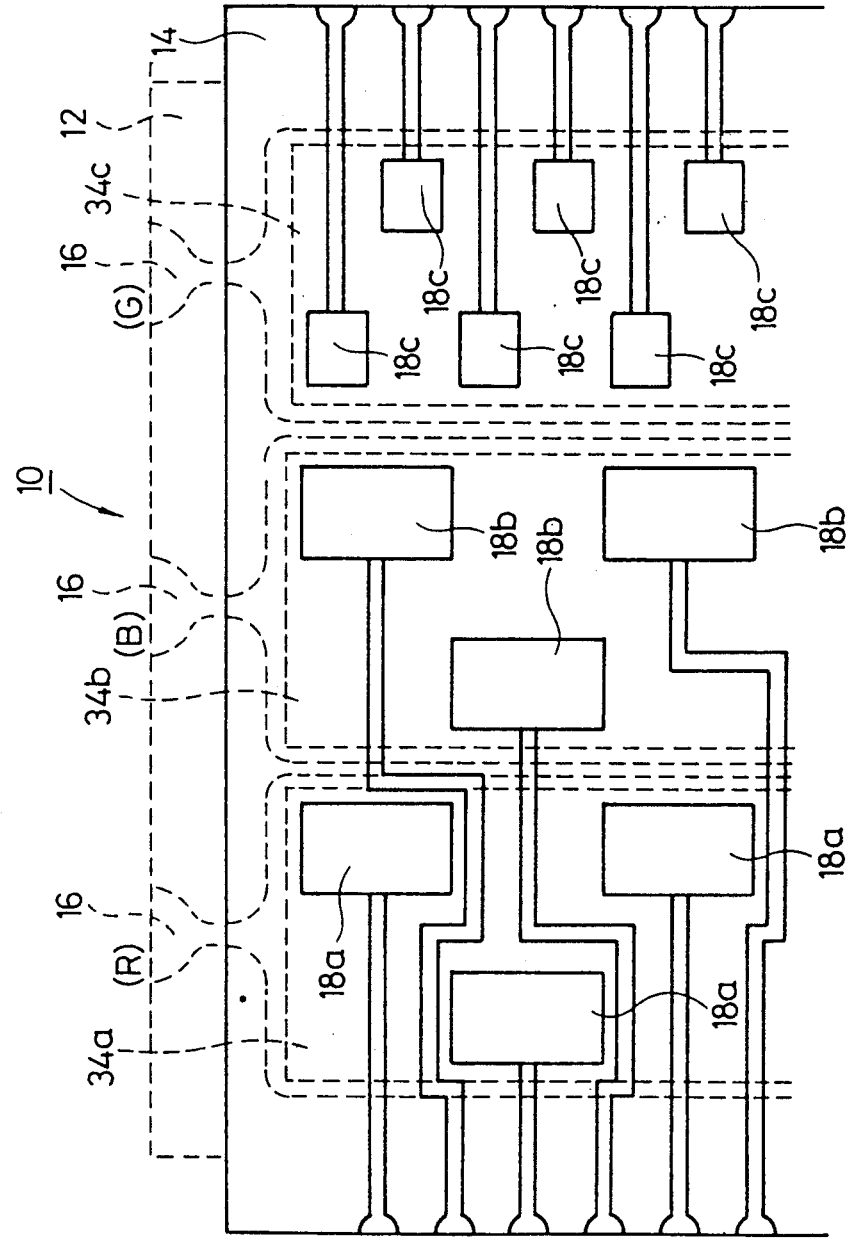
FIG. 2a is a fragmentary plan view of pixel electrodes of a color liquid crystal shutter matrix according to a first embodiment of the present invention.

FIG. 2a fragmentarily shows pixel electrodes of a color liquid crystal shutter matrix according to a first embodiment of the present invention. The color liquid crystal shutter matrix, generally denoted at 10, comprises a known simple matrix or an active matrix such as a TFT (Thin Film Transistor) matrix or an MIM (Metal Insulator Metal) matrix.

Figure 3:
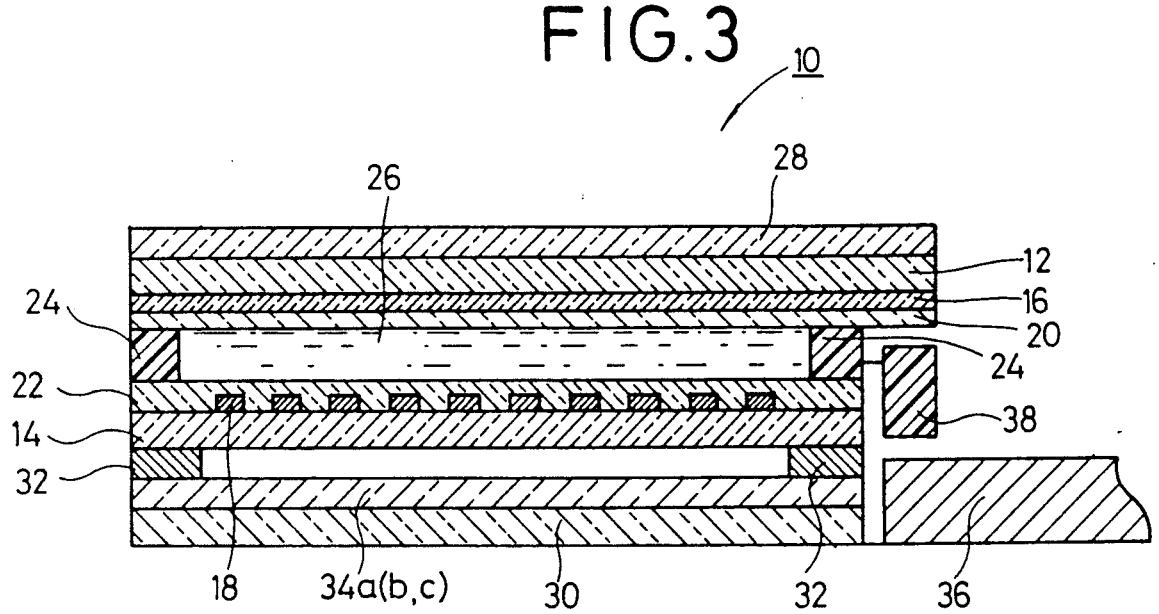

More specifically, as shown in FIGS. 2a and 3, the color liquid crystal shutter matrix 10 has an upper glass plate 12 and a lower glass plate 14 spaced from each other in confronting relation with a liquid crystal (described later) sealed therebetween. The upper and lower glass plates 12, 14 and the liquid crystal sealed therebetween jointly serve as a liquid crystal panel. The upper glass plate 12 supports on an inner surface (i.e., a lower surface) thereof a number of longitudinal transparent electrodes 16 serving as common electrodes, and the lower glass plate 14 supports on an inner surface (i.e., an upper surface) thereof a plurality of transverse electrodes 18 including pixel electrodes 18a, 18b, 18c. Color filters 34a, 34b, 34c composed of thin films containing dyes or pigments of three colors R (red), G (green), and B (blue) are located outwardly (i.e., downwardly) of the lower glass plate 14. The words "longitudinal" and "transverse" are used herein with respect to the elongate configuration of the color liquid crystal shutter matrix 10 as shown in FIG. 8.

The pixel electrodes 18a, 18b, 18c are arranged in arrays corresponding in position to the color filters 34a, 34b, 34c, respectively. The number per unit area of the pixel electrodes 18c which correspond to the color G is greater than the number per unit area of the pixel electrodes 18a or 18b which correspond to the color R or B. In FIG. 2a, only the lower glass plate 14 and the pixel electrodes 18a, 18b, 18c are shown by the solid lines and the other components by the dotted lines for the sake of brevity. The pixel electrodes 18c are staggered in the transverse direction of the color liquid crystal shutter matrix 10, i.e., in a direction perpendicular to the direction along which the pixel electrodes 18a, 18b, 18c are arrayed.

FIG. 2b shows the manner in which the colors R, G, B are overlapped in the pixels of an image which is printed using the color liquid crystal shutter matrix 10. The number per unit area of the pixel electrodes 18c corresponding to the color G is twice the number per unit area of the pixel electrodes 18a or 18b corresponding to the color R or B. Therefore, the number of pixels of the color G is also twice the number of pixels of the color R or B.

As shown in FIG. 3, orientation films 20, 22 for orienting nematic liquid crystal molecules, for example, are formed on the surfaces of the longitudinal electrodes (common electrodes) 16 and the transverse electrodes (pixel electrodes) 18. As shown in FIG. 2a, the common electrodes 16 and the pixel electrodes 18 are directed perpendicularly to each other. The orientation films 20, 22 are spaced from each other in confronting relation with seal members 24 sandwiched therebetween along their peripheral edges. A twisted nematic liquid crystal 26, for example, is sealed in the gap defined by the orientation films 20, 22 and the seal members 24. The liquid crystal that can be employed is however not limited to a twisted nematic liquid crystal, but may be a ferroelectric liquid crystal.

The orientation films 20, 22 orient molecules of the liquid crystal 26 in directions that are 90° spaced from each other at the respective surfaces of the common electrodes 16 and the pixel electrodes 18. A polarizing plate 28 is disposed on the outer surface of the upper glass plate 12, the polarizing pate 28 having a polarizing axis aligned with the direction in which the liquid crystal molecules are oriented at the surface of the common electrodes 16. A metal mask 32 is disposed on the outer surface of the lower glass plate 14, and the color filters 34a, 34b, 34c are mounted on the metal mask 32. The metal mask 32 along the edges of the lower glass plate 14 and the color filters 34a, 34b, 34c, thereby defining a shutter region of the color liquid crystal shutter matrix 10. Another polarizing plate 30 is placed on the outer surface of the color filters 34a, 34b, 34c, the polarizing plate 30 having a polarizing axis aligned with the polarizing axis of the polarizing plate 28.

The above assembly of the color liquid crystal shutter matrix 10 is supported on a printed-circuit board 36. In operation, a drive voltage is applied between the common electrodes 16 and the pixel electrodes 18 through an electrically conductive rubber connector 38.

The color liquid crystal shutter matrix 10 according to the first embodiment of the present invention is basically constructed as described above. Now, operation and advantages of the color liquid crystal shutter matrix 10 will be described below.

When no drive voltage is applied between the common electrodes 16 and the pixel electrodes 18, light falling on the color liquid crystal shutter matrix 10 does not pass therethrough. Conversely, when a drive voltage is applied between the common electrodes 16 and the pixel electrodes 18, the color liquid crystal shutter matrix 10 transmits applied light therethrough. The transmittance of light which is transmitted through the color liquid crystal shutter matrix 10 can be controlled by varying the value of the drive voltage. Therefore, an image with different tones or gradations can be printed using the color liquid crystal shutter matrix 10.

As described later on with reference to FIG. 8, illuminating light is applied to the color liquid crystal shutter matrix 10, and the common electrodes 16 are driven. At the same time, the pixel electrodes 18a, 18b, 18c which correspond respectively to the color filters 34a, 34b, 34c of the three colors R, G and B are driven depending on desired color image information representing the three colors R, G, B, thereby forming an image on a color photosensitive medium. The image on the color photosensitive medium is then developed into a color image.

Figures 4A, 4B:
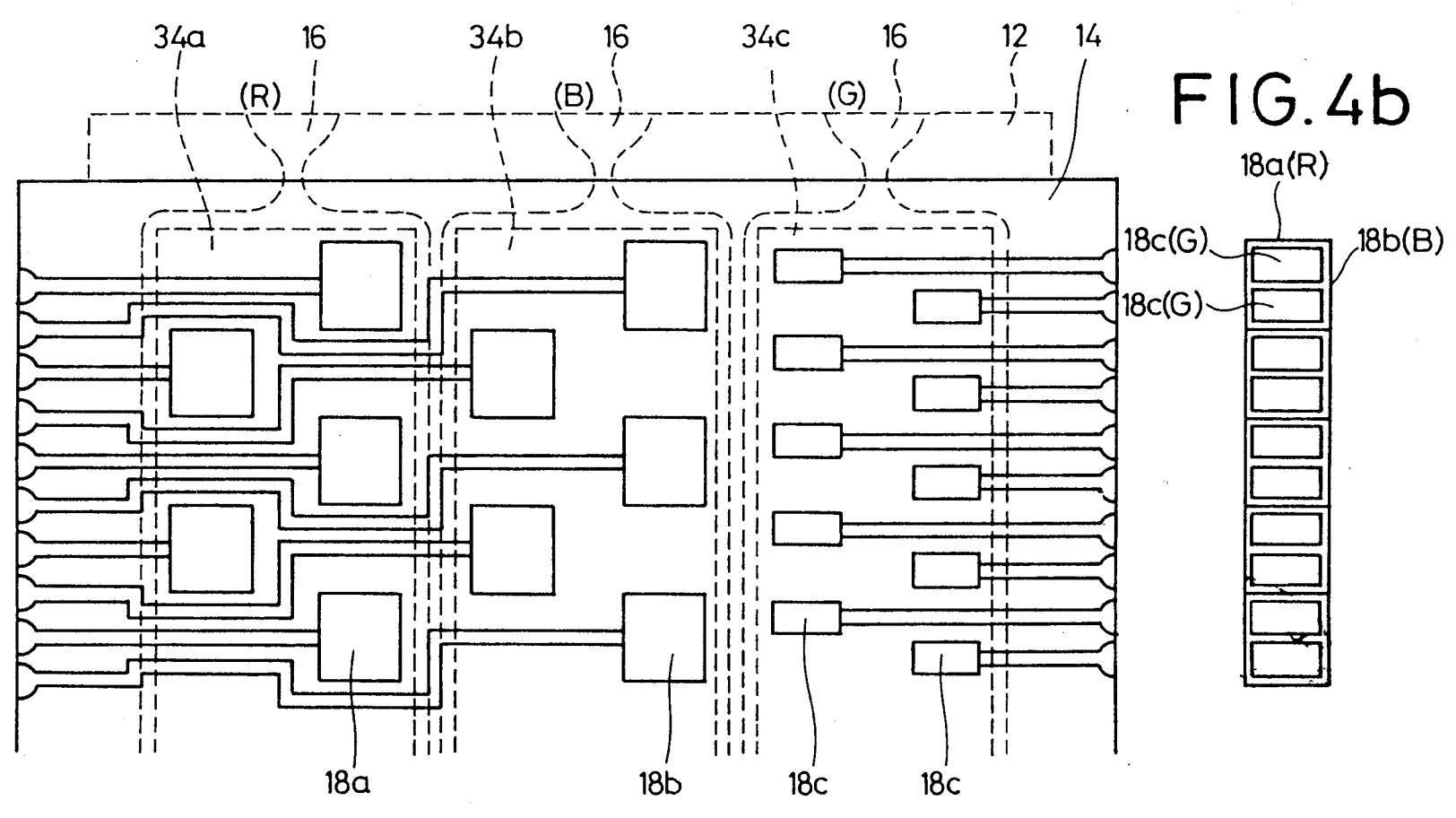

FIGS. 4a and 4b show pixel electrodes of a color liquid crystal shutter matrix according to a second embodiment of the present invention, and an arrangement of pixels of an image which is reproduced using the color liquid crystal shutter matrix according to the second embodiment. The color liquid crystal shutter matrix shown in FIG. 4a differs from the color liquid crystal shutter matrix shown in FIG. 2a only in that the pixel electrodes 18a, 18b, 18c shown in FIG. 4a are narrower in the longitudinal direction than the pixel electrodes 18a, 18b, 18c shown in FIG. 2a.

With the narrower pixel electrodes 18a, 18b, 18c, the number of pixel electrodes 18a, 18b, 18c per unit area may be increased in the longitudinal direction for more accurate adjustment of the sensitivity of the color liquid crystal shutter matrix.

FIGS. 5a and 5b show pixel electrodes of a color liquid crystal shutter matrix according to a third embodiment of the present invention, and an arrangement of pixels of an image which is reproduced using the color liquid crystal shutter matrix according to the third embodiment. According to the third embodiment, each pixel electrode 18a corresponding to the color R or each pixel electrode 18b corresponding to the color B overlaps a plurality of pixel electrodes 18c corresponding to the color G, and each pixel electrode 18a or pixel electrode 18b overlaps one pixel electrode 18b or pixel electrode 18a, in a reproduced pixel.

Figure 6:
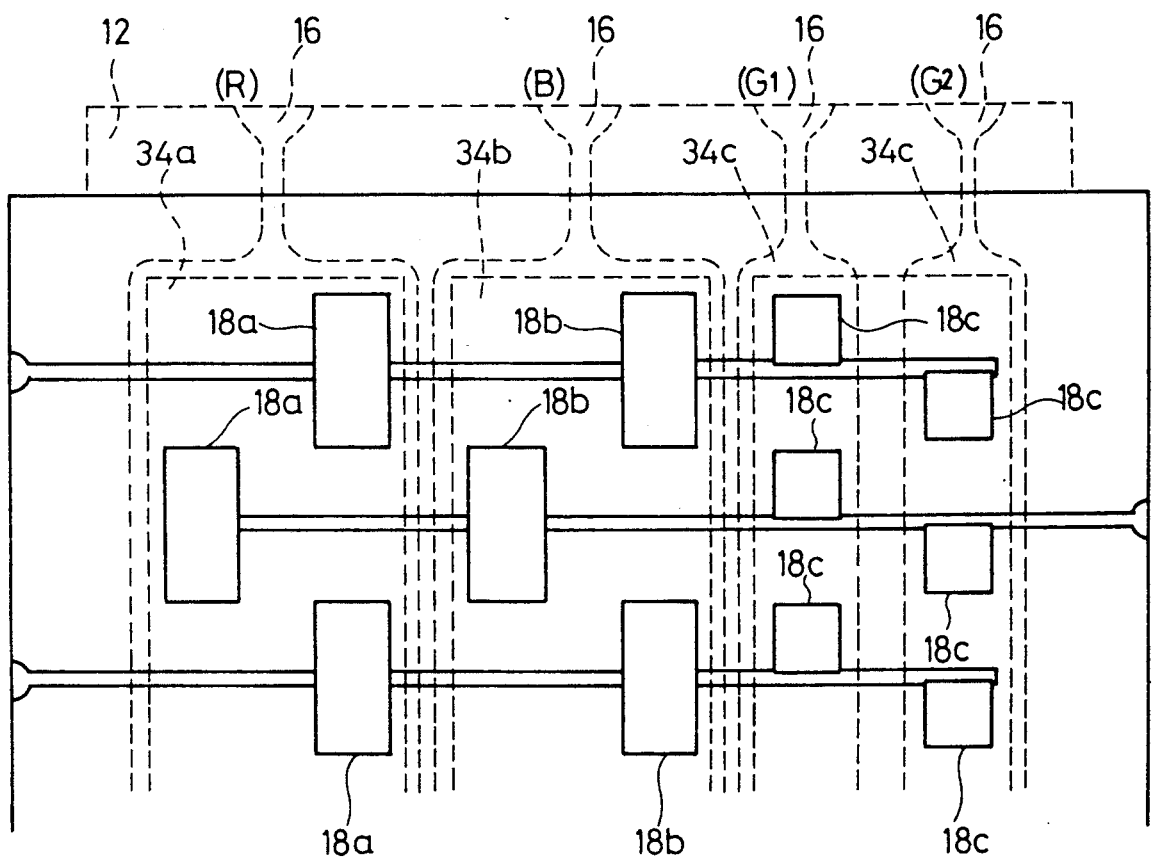
FIG. 6 is a fragmentary plan view of pixel electrodes of a color liquid crystal shutter matrix according to a fourth embodiment of the present invention.

FIG. 6 illustrates pixel electrodes of a color liquid crystal shutter matrix according to a fourth embodiment of the present invention. As shown in FIG. 6, pixel electrodes 18a, 18b, 18c are connected in common along each transverse array, so that the connected pixel electrodes 18a, 18b, 18c can simultaneously be driven. Color filters 34a, 34b correspond to the colors R and B, respectively, and are aligned with the respective longitudinal arrays of the pixel electrodes 18a, 18b. Two color filters 34c correspond to the color G1, G2 (green) and are aligned with the respective longitudinal arrays of the pixel electrodes 18c. When the pixel electrodes 18a, 18b, 18c are simultaneously driven, the common electrodes 16 are successively driven, so that the electrodes can be driven in a multiplex drive mode.

The transverse arrangement of the pixel electrodes 18a, 18b, 18c corresponding to the colors R, G and B is not limited to the illustrated patterns in the above embodiments, but may be of any desired pattern.

Figure 7A:
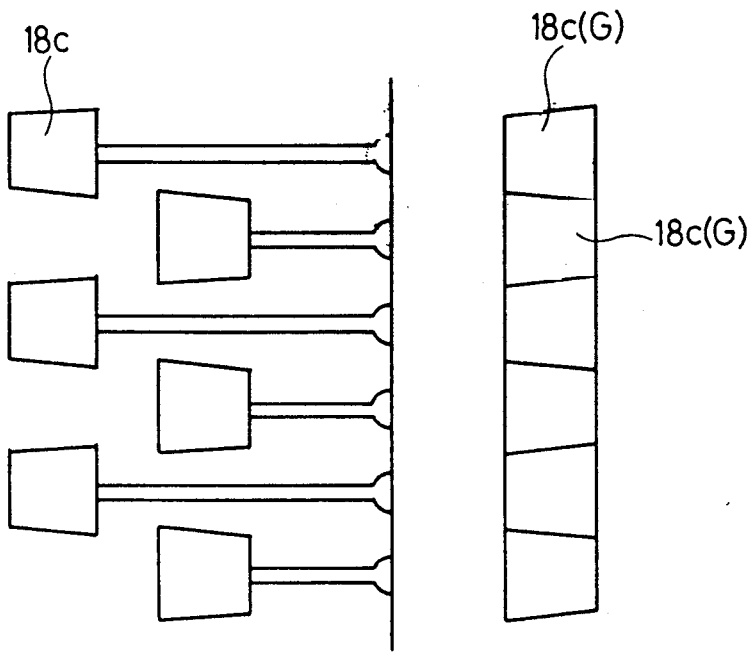
Figure 7B:
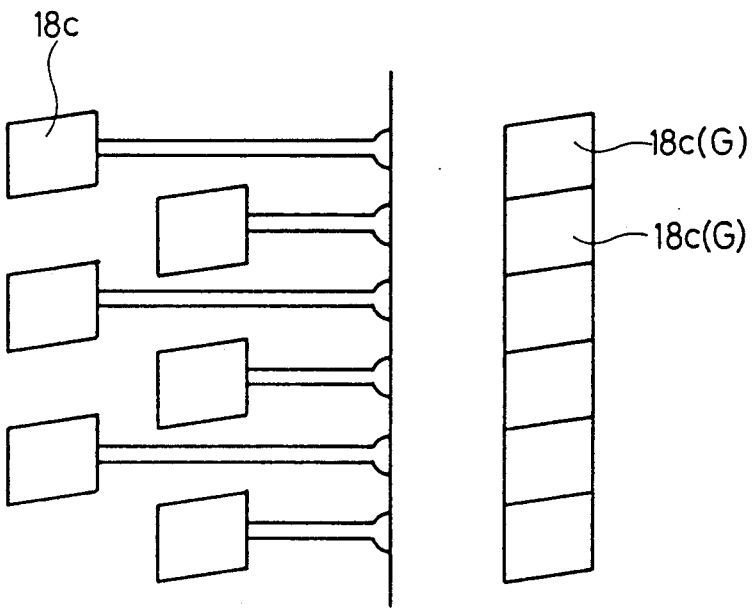

FIGS. 7a, 7b, and 7c show different shapes and vertical arrangements of pixel electrodes 18c. According to each of the patterns shown in FIGS. 7a, 7b, and 7c, the pixel electrodes 18c are shaped and arranged such that pixels reproduced thereby have adjoining or overlapping edges. The illustrated pixel electrode shapes and patterns are effective to average the contrast at the edges of the pixels.

FIG. 8 schematically shows a color image printer incorporating a color liquid crystal shutter matrix according to the present invention.

The color image printer, generally designated by 52, comprises a linear light source 54 in the form of a fluorescent lamp, for example, a light guide optical system 56 such as a condensing lens for guiding light from the light source 54, a color liquid crystal shutter matrix 10 according to the present invention, a focusing optical system 58 such as a graded-index lens which is known as SELFOC lens in the trade, an idle roller 60 for directing a color photosensitive medium 62 to travel in the auxiliary scanning direction indicated by the arrow A, a reference drive roller 64 for feeding the color photosensitive medium 62 under the focusing optical system 58 in the auxiliary scanning direction, and a developing unit 66 for developing a color image formed on the photosensitive medium 62.

In operation, light is emitted from the light source 54, and the common electrodes 16 are driven. The pixel electrodes 18a, 18b, 18c which correspond in position to the color filters 34a, 34b, 34c of the colors R and G and B are also driven depending on desired color image information representing the colors R, G and B, so that the light from the light source 54 is selectively transmitted through the color liquid crystal shutter matrix 10 toward the color photosensitive medium 62. As a result, an image is formed on the color photosensitive medium, and the formed image is then developed into a visible color image on the color photosensitive medium by the developing unit 66.

Instead of the metal mask 32 (FIG. 3), a masking layer for shielding the shutter region of the color liquid crystal shutter matrix may be formed on the common electrodes 16 or the pixel electrodes 18. The color filters 34a, 34b, 34c may be disposed on the inner surface of the upper glass plate 12 or the lower glass plate 14.

The color liquid crystal shutter matrix according to the present invention offers the following advantages.

When a color image is printed using the color liquid crystal shutter matrix, the number per unit area of reproduced pixels corresponding to the color green (G) to which the human visual system is most sensitive is increased. Therefore, a highly fine color image can be reproduced. In the color liquid crystal shutter matrix, no rotary color filter is employed but the pixel electrodes of the color liquid crystal shutter matrix are arranged to print color images at high speed.

Although certain preferred embodiments have been shown and described, it should be understood that many changes and modifications may be made therein without departing from the scope of the appended claims.

What is claimed is:

1. A color liquid crystal shutter matrix comprising:
   a liquid crystal panel which is composed of a pair of transparent substrates and a liquid crystal sealed therebetween, said panel having a longitudinal dimension;
   polarizing films mounted on said liquid crystal panel;
   a drive electrode assembly mounted in said liquid crystal panel and drivable by color image information corresponding to three colors red, green and blue;

said drive electrode assembly comprising a plurality of arrays of pixel electrodes, each of said arrays corresponding to one of said three colors of red, green and blue wherein each of said arrays has a longitudinal dimension disposed parallel with said longitudinal dimension of said liquid crystal panel and each of said arrays is positioned adjacent to another of said arrays; and color filters mounted on said liquid crystal panel over each of said arrays, said filters being composed of thin films containing dyes or pigments of red, green and blue;

the number of the pixel electrodes corresponding to the color green is greater than the number of the pixel electrodes corresponding to each of the colors red and blue.

2. A color liquid crystal shutter matrix according to claim 1, wherein said arrays of pixel electrodes corresponding to the colors red, green and blue extend along a direction in which the pixel electrodes are scanned, and said pixel electrodes corresponding to the color green are elongate across said direction.

3. A color liquid crystal shutter matrix according to claim 1, wherein said arrays of pixel electrodes corresponding to the colors red, green and blue extend along a direction in which the pixel electrodes are scanned, and wherein the pixels reproduced by the pixel electrodes corresponding to the color green overlap the pixels reproduced by the pixel electrodes corresponding to the colors red and blue, and the pixels reproduced by the pixel electrodes corresponding to the color red overlap the pixels reproduced by the pixel electrodes corresponding to the color blue.

4. A color liquid crystal shutter matrix according to claim 1, wherein said arrays of pixel electrodes corresponding to the colors red, green and blue extend along a direction in which the pixel electrodes are scanned, and are connected in common whereby said pixel electrodes corresponding to the colors red, green and blue can simultaneously be driven across said direction.

5. A color liquid crystal shutter matrix according to claim 1, wherein said arrays of pixel electrodes corresponding to the colors red, green and blue extend along a direction in which the pixel electrodes are scanned, and said pixel electrodes corresponding to the color green are staggered along a direction perpendicular to said direction.

6. A color liquid crystal shutter matrix according to claim 5, wherein the pixels reproduced by the pixel electrodes corresponding to the color green are overlapped.

7. A color liquid crystal shutter matrix according to claim 1, wherein the array of pixel electrodes corresponding to the color of green are staggered in a direction perpendicular to the direction along which the pixel arrays are arranged.

8. A color liquid crystal shutter matrix according to claim 1, wherein the color filter containing dyes or pigments of green includes two color filters which correspond to the color of green, each of the two color filters being aligned with respective longitudinal arrays of pixel electrodes and having common electrodes which are successively driven such that the electrodes can be driven in a multiplexed mode.

9. A color liquid crystal shutter matrix according to claim 1, wherein each reproduced pixel electrode corresponding to the color of red or each reproduced pixel electrode corresponding to the color of blue overlaps a plurality of reproduced pixel electrodes corresponding to the color of green, and each reproduced pixel electrode corresponding to the color of red or blue overlaps one reproduced pixel electrode corresponding to the other color of red or blue.

10. A color liquid crystal shutter matrix according to claim 1, wherein each pixel electrode corresponding to the color of green is arranged and shaped such that reproduced green pixel electrodes have adjoining or overlapping edges.

11. A color liquid crystal shutter matrix according to claim 1, wherein a surface area of each pixel electrode corresponding to the color green is substantially half of a surface area of each pixel electrode corresponding to the colors blue or red.

* * * * *